(12) United States Patent  
Sone et al.

(10) Patent No.: US 12,290,963 B2  
(45) Date of Patent: May 6, 2025

(54) METHOD AND APPARATUS FOR PRODUCING RECYCLED RESIN PELLETS

(71) Applicant: MARUYASU CO., LTD., Niihama (JP)

(72) Inventors: Koji Sone, Niihama (JP); Yuya Hino, Niihama (JP); Reiji Ogawa, Niihama (JP); Toshio Nomura, Niihama (JP)

(73) Assignee: MARUYASU CO., LTD., Ehime (JP)

( * ) Notice: Subject to any disclaimer, the term of this patent is extended or adjusted under 35 U.S.C. 154(b) by 189 days.

(21) Appl. No.: 18/001,430

(22) PCT Filed: Feb. 19, 2021

(86) PCT No.: PCT/JP2021/006447  
§ 371 (c)(1),  
(2) Date: Dec. 9, 2022

(87) PCT Pub. No.: WO2022/176171  
PCT Pub. Date: Aug. 25, 2022

(65) Prior Publication Data  
US 2023/0219259 A1 Jul. 13, 2023

(51) Int. Cl.  
*B29B 9/02* (2006.01)  
*B29K 105/26* (2006.01)

(52) U.S. Cl.  
CPC ............ *B29B 9/02* (2013.01); *B29K 2105/26* (2013.01)

(58) Field of Classification Search  
None  
See application file for complete search history.

(56) References Cited

U.S. PATENT DOCUMENTS

| 4,009,235 A | 2/1977 | Bober |
| 5,139,403 A | 8/1992 | Stuart |

FOREIGN PATENT DOCUMENTS

| GB | 777778 A | 6/1957 |
| JP | S52-54752 A | 5/1977 |
| JP | S57-78914 U1 | 5/1982 |

(Continued)

OTHER PUBLICATIONS

Extended European Search Report dated Jun. 6, 2023 for the corresponding European Patent Application No. 21926604.6, 8 pages.

(Continued)

*Primary Examiner* — Jacob T Minskey  
*Assistant Examiner* — Adrianna N Konves  
(74) *Attorney, Agent, or Firm* — LUCAS & MERCANTI, LLP

(57) ABSTRACT

Provided is a method for producing recycled pellets, capable of using loss films that have been inapplicable so far including a thick loss film, a wide loss film, and a loss film made of a material that has high hardness and therefore is less likely to be bent, and also capable of producing recycled pellets similar to virgin pellets. A method for producing recycled pellets includes the steps of: twisting one or more loss films (R) continuously supplied in one direction while applying a stretch to the loss film; pressurizing a twisted part to pressure-bond contact parts of the loss film (R), thereby forming a twisted string (R); and cutting the twisted string (R) to produce recycled pellets (P). The loss film (R) is preheated at a softening temperature of the loss film (R) prior to twisting the loss film (R) while stretching it.

2 Claims, 11 Drawing Sheets

(56) References Cited

FOREIGN PATENT DOCUMENTS

| JP | S62-231709 A | 10/1987 |
|---|---|---|
| JP | 2011-020413 A | 2/2011 |
| JP | 2012-081605 A | 4/2012 |
| JP | 2019-030994 A | 2/2019 |

OTHER PUBLICATIONS

International Search Report for the corresponding patent application No. PCT/JP2021/006447 dated Apr. 13, 2021, with English translation.

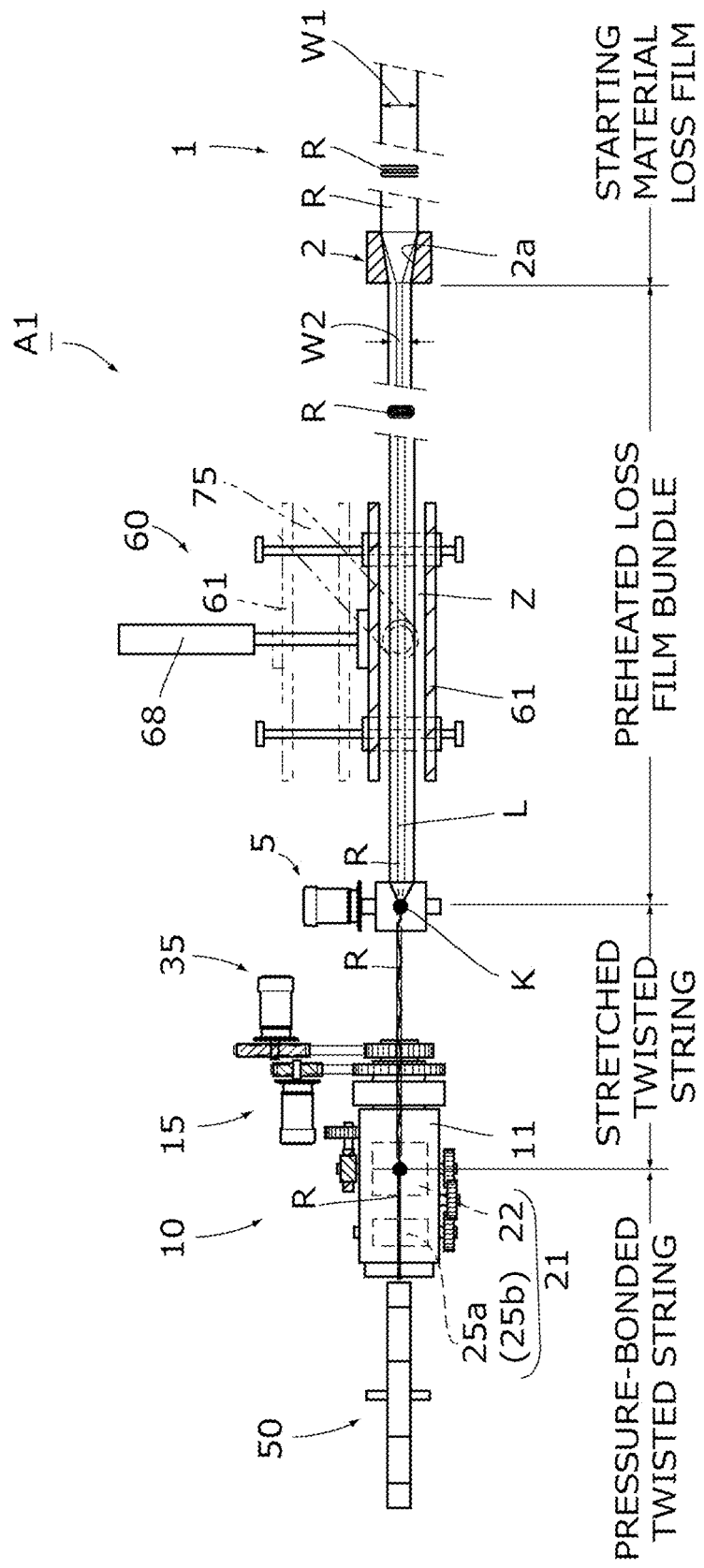
[FIG. 1]

[FIG. 2]
(a)
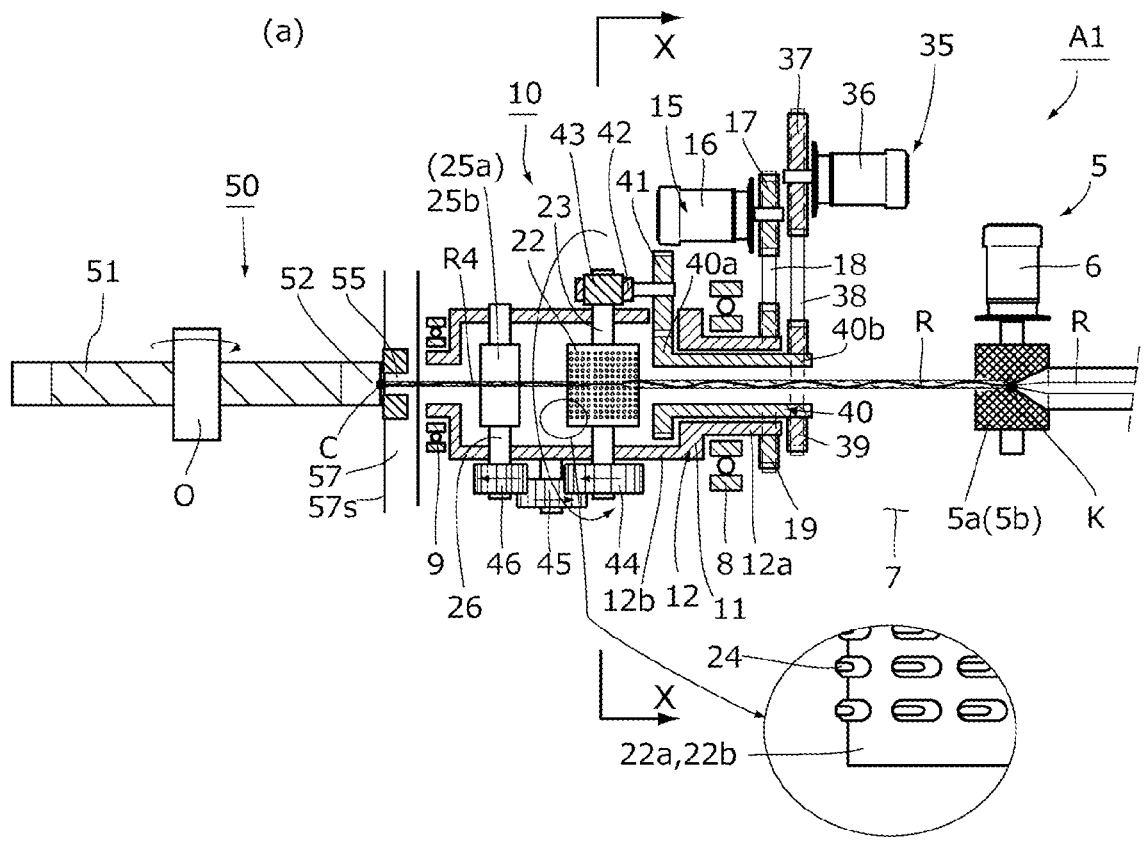
(b)
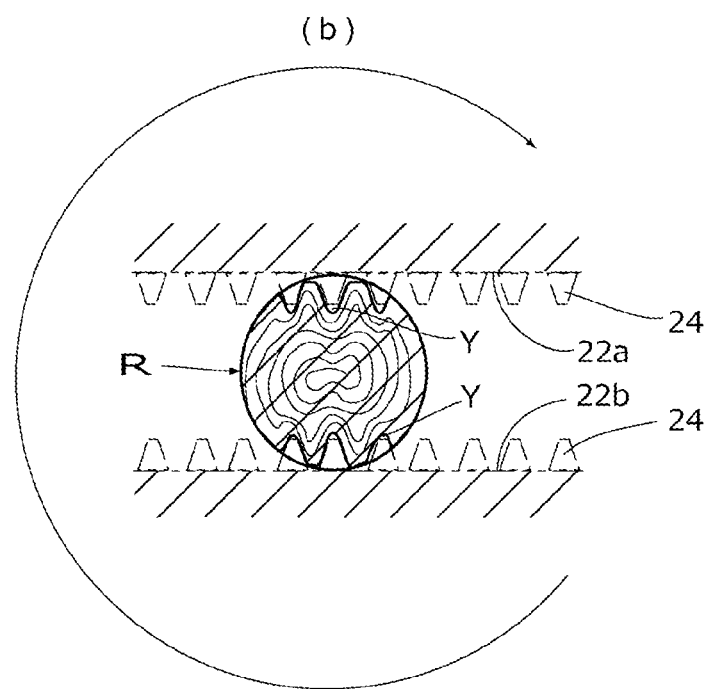

[FIG. 3]
(a)
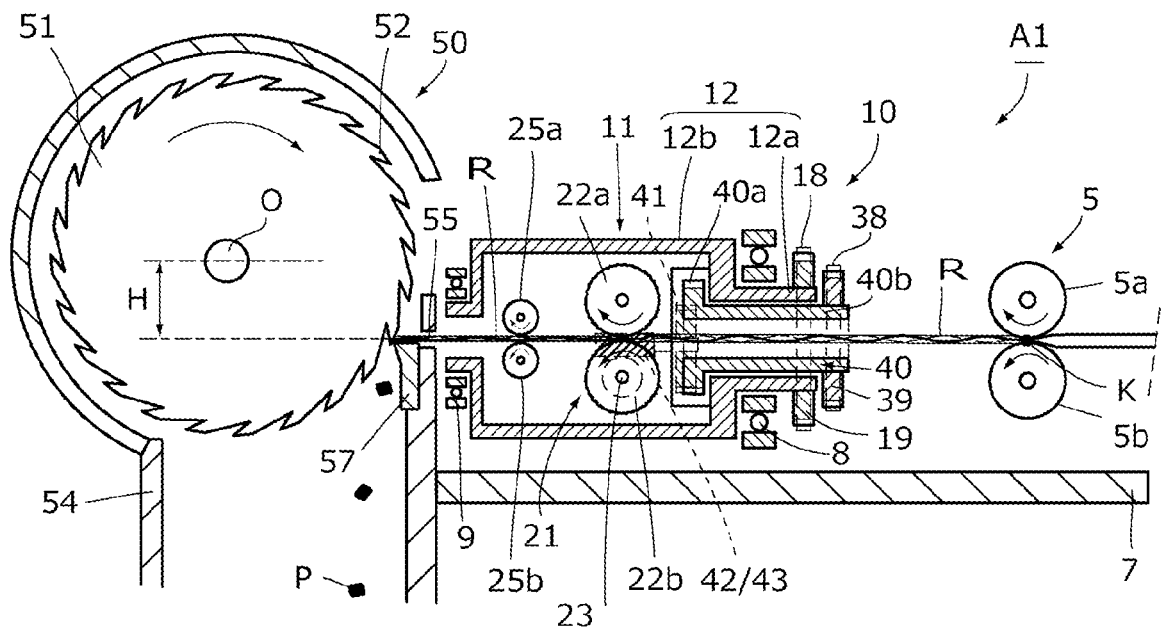
(b)
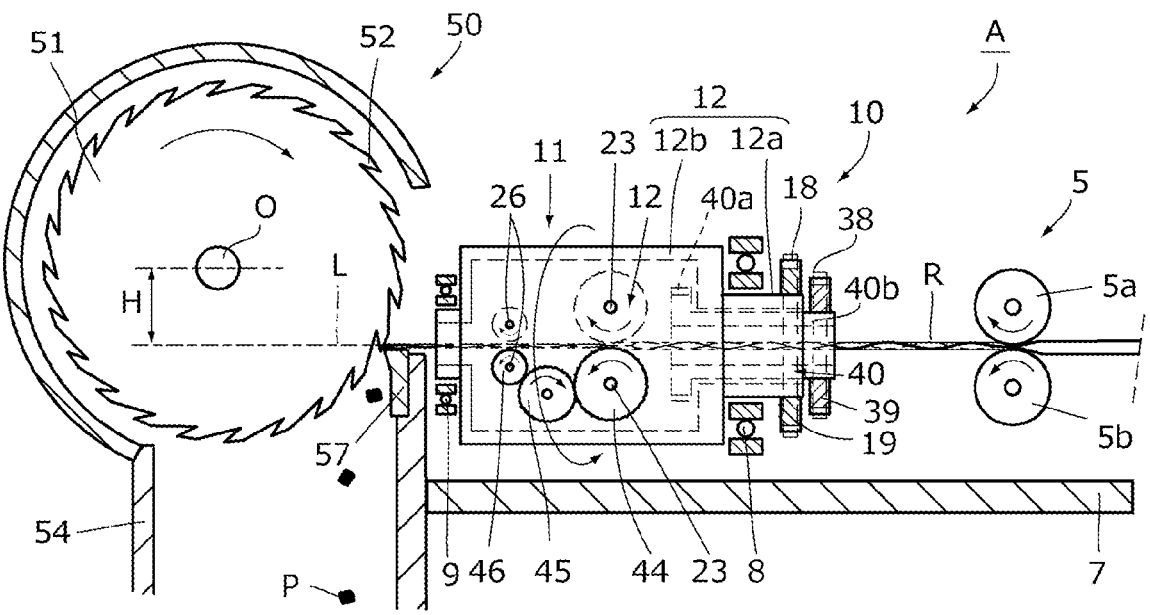

[FIG. 4]
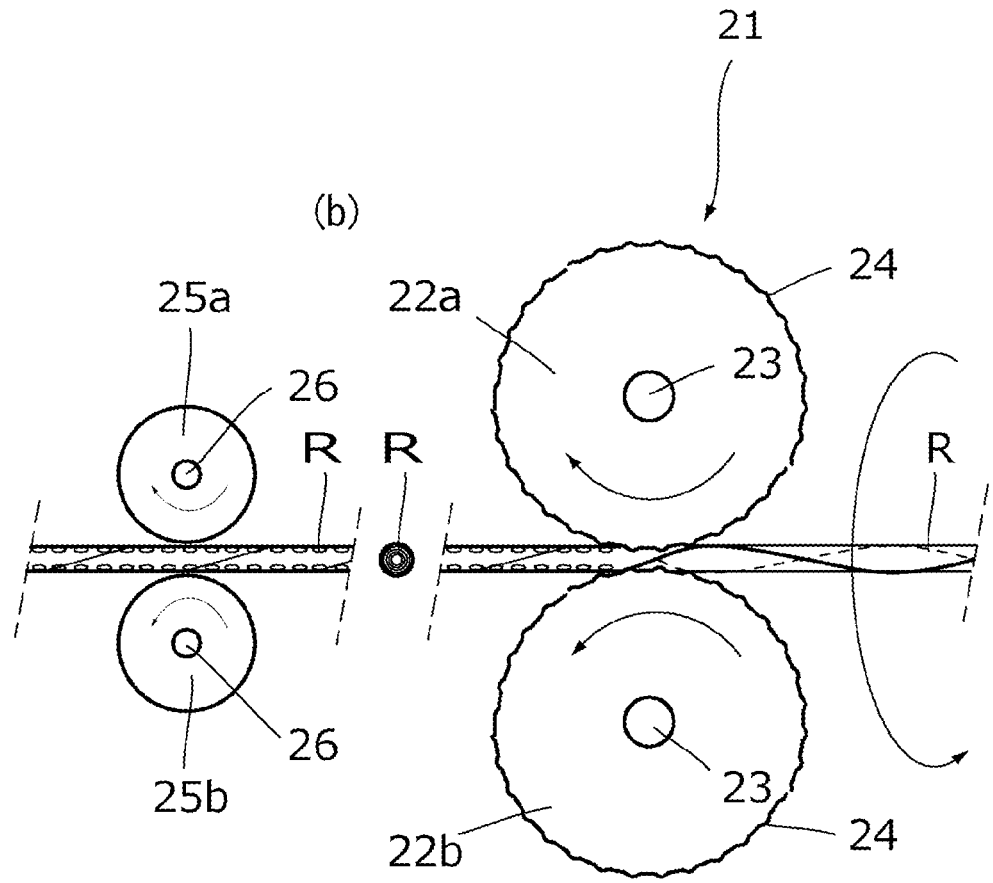
[FIG. 5]
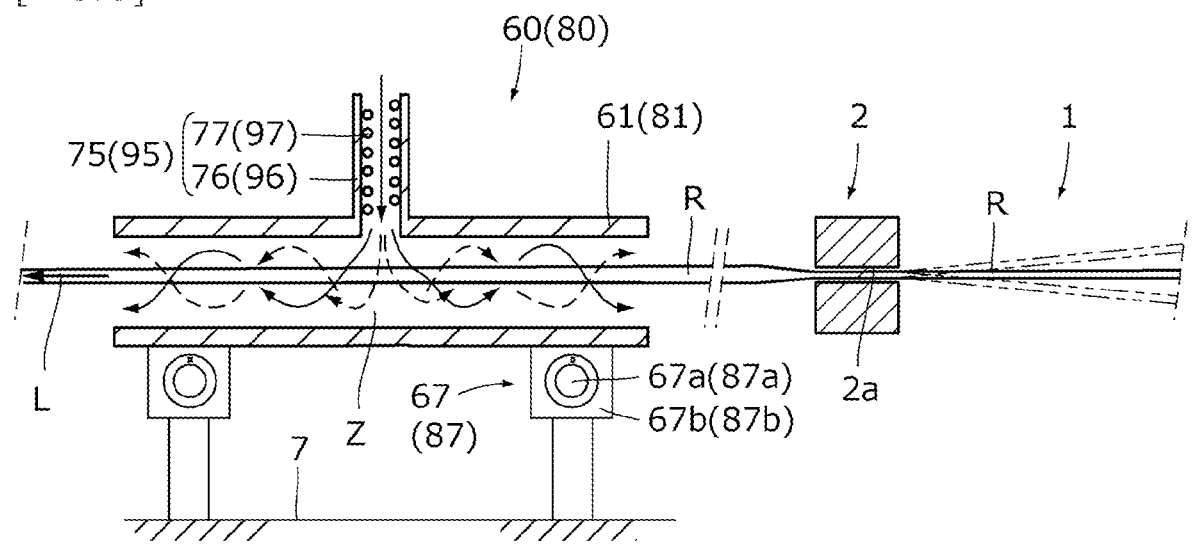

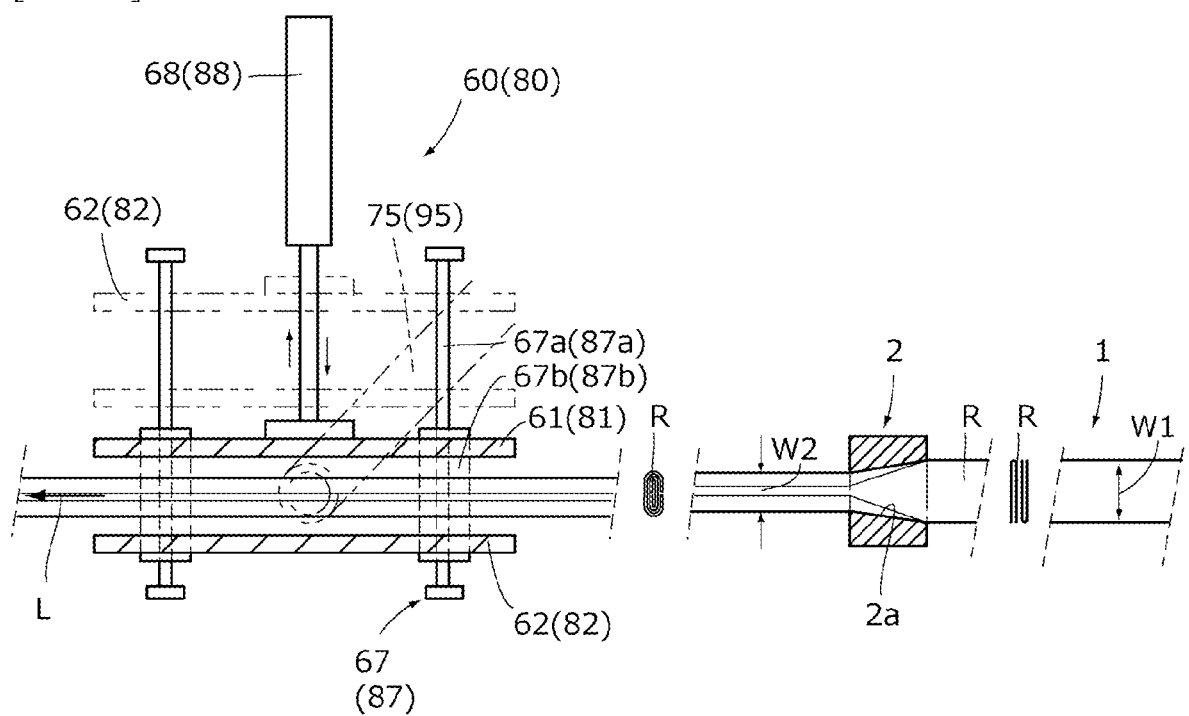
[FIG. 6]

[FIG. 7]
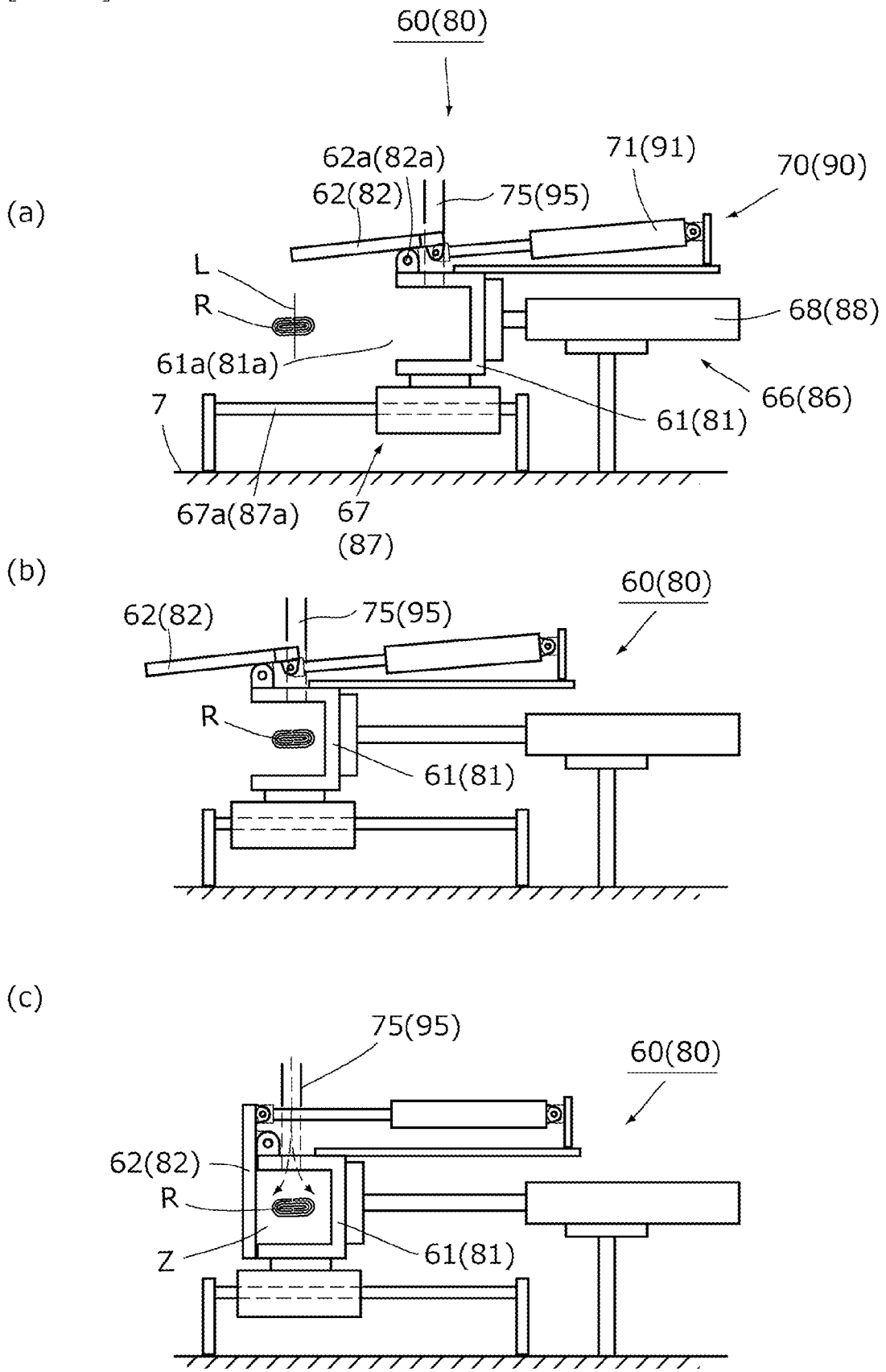

[FIG. 8]
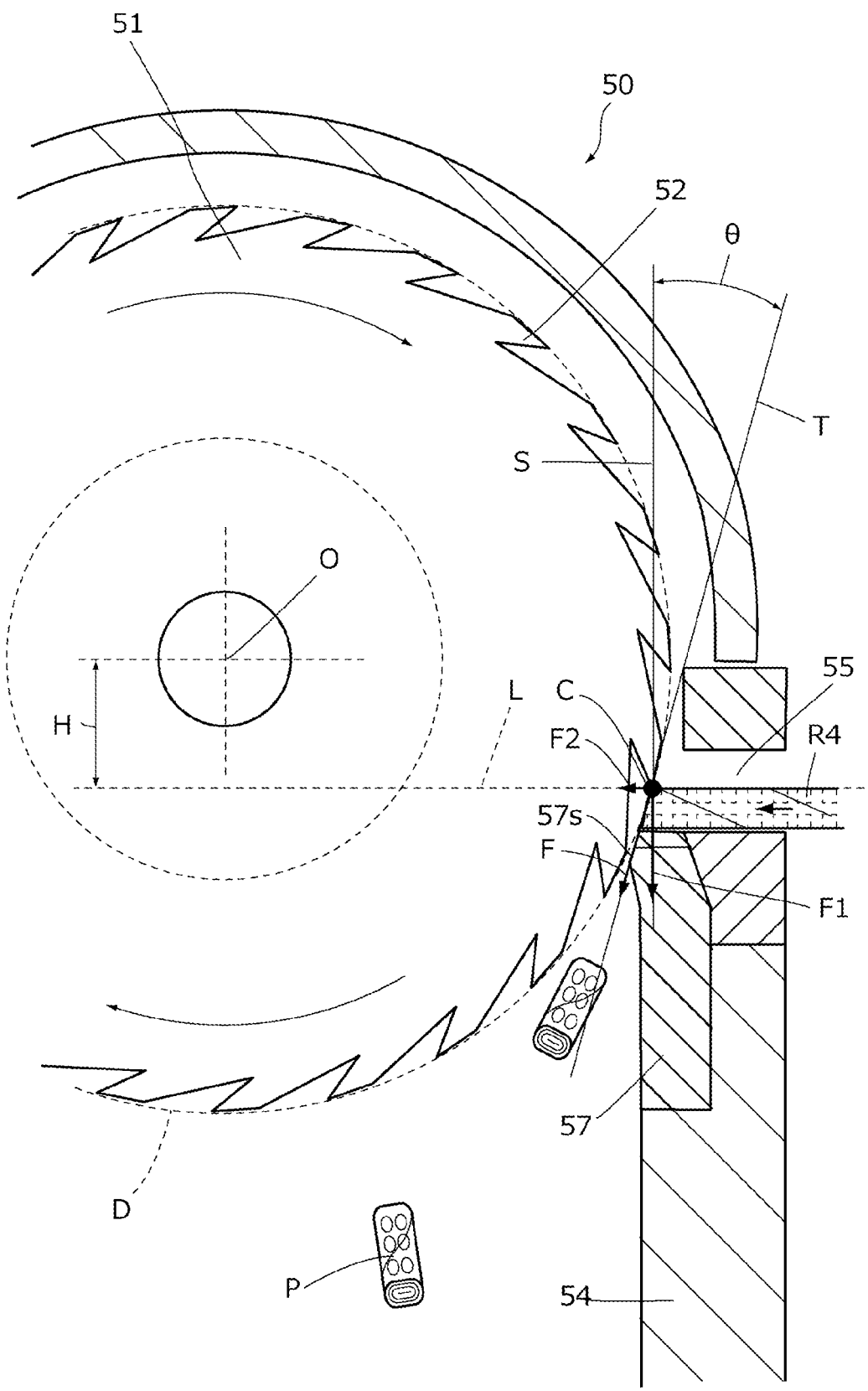

[FIG. 9]
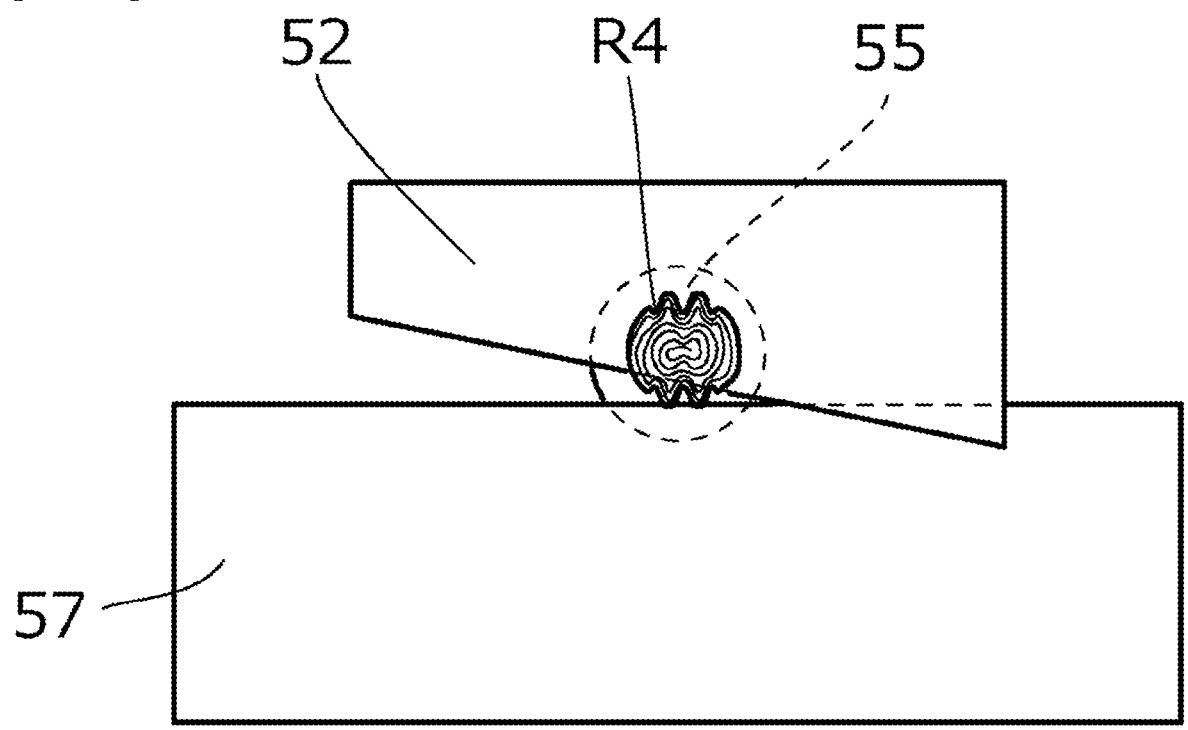

[FIG. 10]
(a)
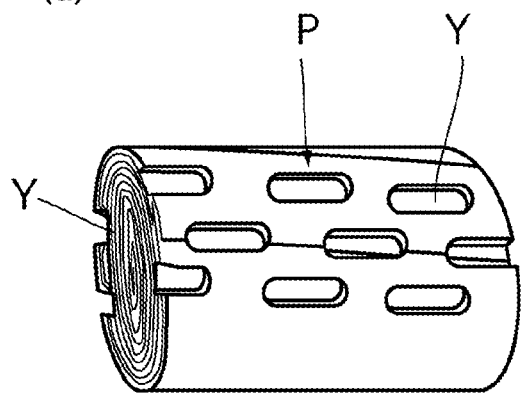
(b)
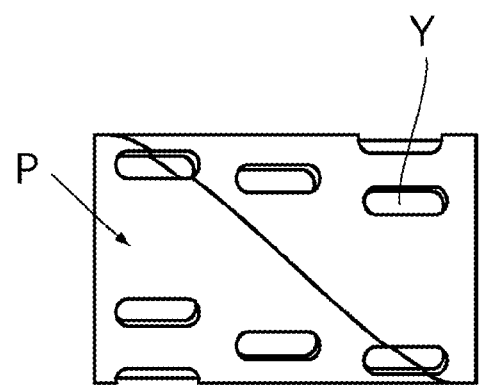
(c)
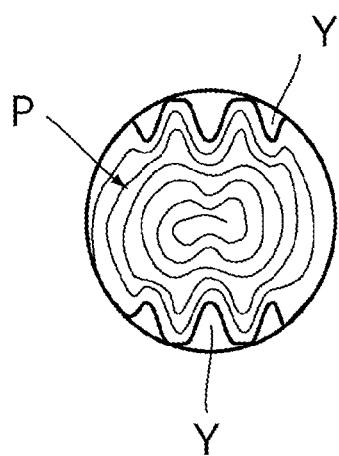
(d)
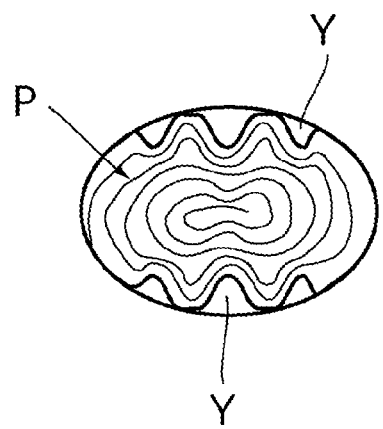

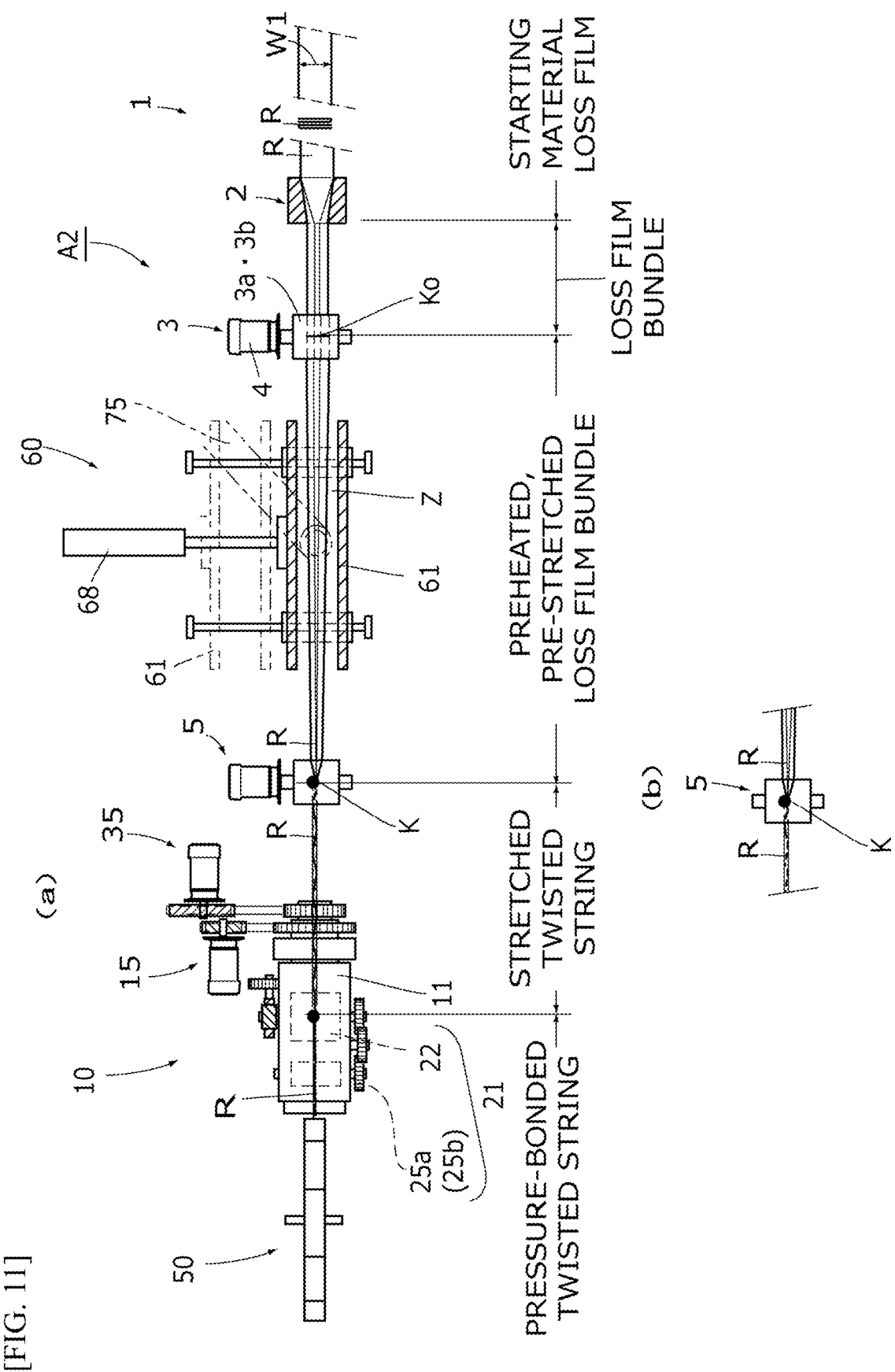
[FIG. 11]

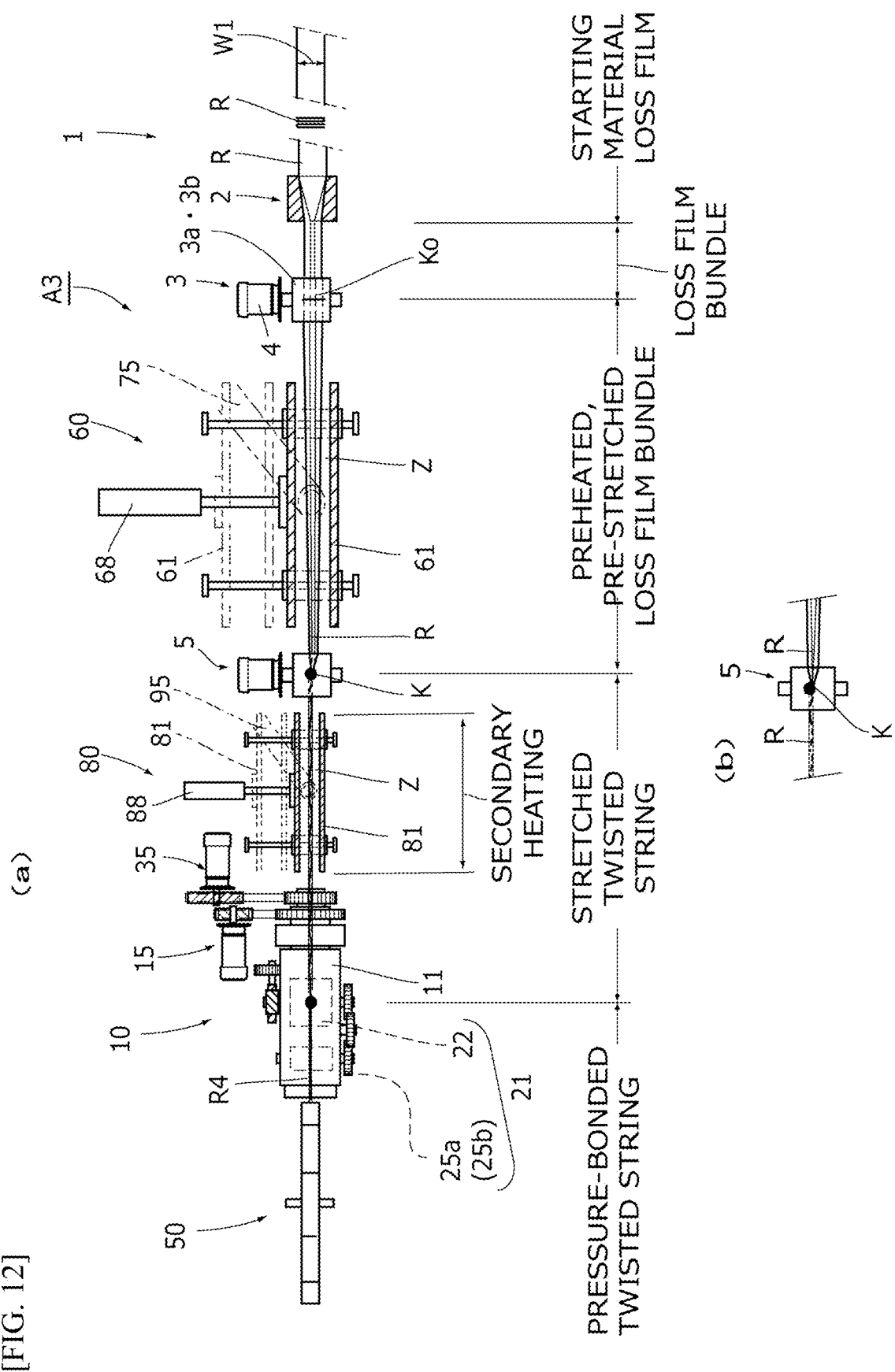
[FIG. 12]

METHOD AND APPARATUS FOR PRODUCING RECYCLED RESIN PELLETS

CROSS REFERENCE TO RELATED APPLICATION

This Application is a 371 of PCT/JP2021/006447 filed on Feb. 19, 2021, which is incorporated herein by reference.

TECHNICAL FIELD

The present invention relates to improvement in a method and an apparatus for producing recycled resin pellets from selvages that are cutting selvages on both ends of double films manufactured, for example, by inflation molding, or loss films generated in other manufacturing processes (for example, double films with faulty thickness, and double films broken during the production).

BACKGROUND ART

Processing a bulk of loss films generated in a manufacturing process of resin films or the like (long selvages having a certain degree of width, and production loss) to utilize the loss films as recycled resin pellets (hereinafter, simply referred to as "recycled pellets") has been widely conducted. It has been pointed out that when loss films are heat-melted and resin in an elongated string form having a circular cross-section is formed through extrusion-molding followed by cutting for production of the recycled pellets, uniform cylindrical pellets with a shape similar to a rice-grain-like virgin pellet can be produced, but deterioration in quality of the resin progresses due to heating for re-melting. Therefore, a technique capable of producing such recycled pellets without heating has been demanded.

As one example of a recycled pellet producing apparatus capable of producing recycled pellets without heating, PTL 1 below is known. The recycled pellet producing apparatus described in PTL 1 is composed of a loss film supply section, a stretching section, a rotary compression section, and a cutting section.

The loss film supply section is a section for laying one or more loss films made of synthetic resin on one another and feeding them to the stretching section while applying a certain tension.

The stretching section is a section for stretching the fed one or more loss films without heating, narrowing a thin stretched film after stretching thinly to produce one thin stretched loss film bundle, and sending out the thin stretched loss film bundle to the rotary compression section arranged on the downstream side.

The rotary compression section includes a pair of compression rollers having recesses and projections on the outer circumferences, and subsequent take-up rollers, and rotates relatively to the stretching section. The rotary compression section is a section for applying torsion to the thin stretched loss film bundle taken up from the stretching section by the relative rotation, while point compressing the loss film to form a pressure-bonded twisted string with recessed indentations. Since the twisted string is strongly compressed so that deep recessed indentations are formed, it is sent out as a flat twisted string. The take-up rollers are parts that rotate in a sending direction while sandwiching the flat pressure-bonded twisted string with recessed indentations and send out the twisted string to the cutting section.

The cutting section includes a circular saw-like cutter and a guide roller disposed just in front of the cutting position of the above twisted string by the cutter. The guide rollers feed the twisted string having been pulled out from the take-up rollers of the rotary compression section while rotating, to the cutting position, while sandwiching the twisted string from above and below. Then the twisted string is cut into short pieces by the cutter, resulting in flat recycled pellets with recessed indentations on the front and back.

CITATION LIST

Patent Literature

[PTL 1] Japanese Laid-Open Patent Publication No. 2012-81605

SUMMARY OF INVENTION

Technical Problem

In the conventional apparatus shown in PTL 1, although recycled pellets that are tolerant to untwisting owing to the recessed indentations can be formed, the cross-sectional area of the twisted string cannot be made large due to the restriction of the depth of the recessed indentations (that is, the indentations should be formed near the core of the twisted string). Therefore, it was impossible to produce recycled pellets having a large cross-sectional area, and the productivity was limited.

In addition, besides the loss films that are applicable to conventional apparatuses (that is, the loss films that are thin and soft, easy to form indentations on and twist, and not too wide), there are bulk loss films that are inapplicable including a thick loss film, a wide loss film, and a loss film made of a material that has high hardness and therefore is less likely to be bent. Such a thick loss film or a loss film made of a material that has high hardness and therefore is less likely to be bent cannot be formed with indentations and are difficult to be pressure-bonded even if they are compressed. They sometimes tear during stretching, and moreover, they cannot be twisted densely and are difficult to be formed into a string shape. Even if they are formed into a string shape, the string is not dense and has many gaps, so that they cannot be recycled into pellets of high quality. Therefore, in such production of recycled pellets, it has been desired to further expand the range of application of loss films in terms of resource reuse.

Since the conventional apparatus can continuously produce recycled pellets, high-speed processing of the loss films is enabled and the productivity can be enhanced, however, strong compression to create indentations is required as described above. The strong compression makes the cross section of the twisted string flat. When the twisted string with a flat cross section is cut, the shape of the cut recycled pellets is also inevitably flat, which is different from the shape of rice-grain-like virgin pellets. This results in a disadvantage of poor accuracy in material mixing with virgin pellets.

The present invention was made in light of the problems of the conventional art, and it is an object of the present invention to provide a method and an apparatus for producing recycled pellets which, firstly, are capable of producing recycled pellets having a large diameter without restriction of the depth of recessed indentations; secondly, enable production of recycled pellets having a cross-sectional shape that is similar to a circle to some extent and being similar to virgin pellets; and thirdly, are capable of making loss films, which have been inapplicable so far including a thick loss film, a wide loss film, and a loss film made of a material that has high hardness and therefore is less likely to be bent, as well as conventional loss films, into a predetermined twisted string, and cutting the twisted string to produce recycled pellets that are comparable to virgin pellets.

Solution to Problem

The invention described in embodiment 1 (method invention: (a), (b) of FIG. 11) is
a method for producing recycled pellets comprising the steps of: twisting one or more loss films R continuously supplied in one direction, while applying a stretch to the loss film; pressurizing a twisted part to pressure-bond contact parts of the loss film R, thereby forming a twisted string R; and cutting the twisted string R to produce recycled pellets P, wherein
the loss film R is preheated at a softening temperature of the loss film R prior to stretching the loss film R while twisting it, and
in the step of preheating the loss film, the loss film is further pre-stretched.

Since the preheating temperature is the softening temperature of the loss film R, the material of the loss film R is not deteriorated. The loss film R softened by this preheating is twisted while being stretched in the next step, and the twisted part is further pressurized. Thus, the loss films R are fused to each other at least in a closely contacted part in the surface part of the twisted loss film R. Therefore, even when it is cut to produce pellets, recycled pellets P will not be untwisted because the loss films R are fused to each other at least in the surface part. In addition, owing to the preheating, there is no need for strong compression to form deep recessed indentations Y (or no need for recessed indentations Y) as before, and the recycled pellets P can be approximated to rice-grain-like virgin pellets by making the cross section almost circular or nearly circular oval, and recycled pellets P having a larger diameter can also be produced. In other words, the cross section of the recycled pellets P in the present invention is not flattened as in the conventional example.

Further pre-stretching the loss film R in the step of preheating it reduces the thickness of a thick loss film R or a hard loss film R that is difficult to be twisted, and makes it easy to apply a stretch and a twist to the loss film R in the subsequent stretching and twisting step (twisting step). Thus, the loss films R that have not been a subject to be processed can be made into a subject to be processed. Note that pre-stretching is not performed for a normal starting material loss film R.

The invention described in embodiment 2 (production method: (a), (b) of FIG. 12) is
the method for producing recycled pellets according to embodiment 1, wherein
in the step of twisting the loss film R (twisting step), the loss film R is stretched under heating at the softening temperature of the loss film.

This makes the twist of the loss film R denser, and recycled pellets P that are denser and more similar to virgin pellets can be produced.

The invention described in embodiment 3 (apparatus: (a) of FIG. 11) is
an apparatus A2 for producing recycled pellets, comprising:
a loss film supply section 1 configured to bundle one or more loss films R of thermoplastic resin into a predetermined width W2 and supply a resultant loss film bundle to an intermediate feed section 5;
the intermediate feed section 5 configured to send out the supplied loss film R while sandwiching the supplied loss film R, the intermediate feed section serving as a starting point K of twisting of the loss film R; and
a rotary compression section 10 supplied with the loss film R from the intermediate feed section 5, and configured to rotate relatively to the intermediate feed section 5 to twist the loss film R, take up the loss film R faster than a sending speed of the intermediate feed section 5 to apply a stretch to the loss film R, and send out a twisted string R,
the apparatus producing recycled pellets P by cutting the twisted string R sent out from the rotary compression section 10, at a predetermined length, wherein
a first heating section 60 configured to preheat the loss film R at the softening temperature of the loss film R is disposed between the loss film supply section 1 and the intermediate feed section 5, and
a pre-stretch feed section 3 having a loss film feeding speed slower than a loss film take-up speed of the intermediate feed section 5, and serving as a starting point Ko of pre-stretching of the loss film R in the first heating section 60, is further disposed between the loss film supply section 1 and the first heating section 60.

The invention described in embodiment 4 (apparatus: (b) of FIG. 11) is
an apparatus A2 for producing recycled pellets, comprising:
a loss film supply section 1 configured to bundle one or more loss films R of thermoplastic resin into a predetermined width W2 and supply a resultant loss film bundle to an intermediate feed section 5;
the intermediate feed section 5 configured to send out the supplied loss film R while sandwiching the supplied loss film R, the intermediate feed section serving as a starting point K of twisting of the loss film R; and
a rotary compression section 10 supplied with the loss film R from the intermediate feed section 5, and configured to rotate relatively to the intermediate feed section 5 to twist the loss film R, take up the loss film R faster than a sending speed of the intermediate feed section 5 to apply a stretch to the loss film R, and send out a twisted string R,
the apparatus producing recycled pellets P by cutting the twisted string R sent out from the rotary compression section 10, at a predetermined length, wherein
a first heating section 60 configured to preheat the loss film R at the softening temperature of the loss film R is disposed between the loss film supply section 1 and the intermediate feed section 5, and
a pre-stretch feed section 3 having a loss film feeding speed slower than a loss film take-up speed of the rotary compression section 10, and serving as a starting point Ko of pre-stretching of the loss film R in the first heating section 60, is further disposed between the loss film supply section 1 and the first heating section 60 via the intermediate feed section 5.

The invention described in embodiment 5 (apparatus: (a), (b) of FIG. 12) is
the apparatus A3 for producing recycled pellets according to embodiment 3 or 4, wherein
a second heating section 80 that heats a stretched twisted string R before pressurization having been twisted and stretched by the intermediate feed section 5 and the rotary compression section 10, at a softening temperature of the stretched twisted string R before pressurization, is further disposed between the intermediate feed section 5 and the rotary compression section 10.

The invention described in embodiment 6 is the apparatus A2, A3 for producing recycled pellets according to any one of embodiments 3 to 5, wherein the first heating section 60 comprises:

a heating section body 61 that reciprocates between a heating position that surrounds a movement line L of a loss film bundle R to be preheated, and a retracted position out of the heating position, the heating section body having an opening 61a that is a gate for the loss film R to be preheated during the reciprocation, the opening being formed over the entire surface of the heating section body on a moving direction side;

an opening/closing lid 62 that closes the opening 61a at the time of heating to form a heating space Z inside for the loss film R; and a hot air supplying part 75 that supplies the heating space Z with hot air.

The invention described in embodiment 7 is the apparatus A3 for producing recycled pellets according to embodiment 5, wherein the second heating section 80 comprises:

a heating section body 81 that reciprocates between a heating position that surrounds a movement line L of a stretched twisted string R to be secondarily heated, and a retracted position out of the heating position, the heating section body having an opening 81a that is a gate for the stretched twisted string R to be secondarily heated during the reciprocation, the opening being formed over the entire surface of the heating section body on a moving direction side;

an opening/closing lid 82 that closes the opening 81a at the time of heating to form a heating space Z inside for the stretched twisted string R to be secondarily heated; and a hot air supplying part 95 that supplies the heating space Z with hot air.

The invention described in embodiment 8 is the apparatus A2, A3 for producing recycled pellets according to any one of embodiments 3 to 7, wherein a cutter 51 that cuts the twisted string R sent out from the rotary compression section 10 at a predetermined length is a circular saw-like blade in a form of a disc with a number of cutting blades 52 attached at regular intervals around the disc, and a rotary shaft O of the cutter is located above an extension line of a movement line L of a pressure-bonded twisted string R.

Advantageous Effects of Invention

As described above, the present invention enables production of recycled pellets having a large diameter from recycled pellets having a small diameter, and also enables production of recycled pellets having a cross-sectional shape that is similar to a circle to some extent. In addition, it is now possible to make loss films, which have been inapplicable so far including a thick loss film, a wide loss film, and a loss film made of a material that has high hardness and therefore is less likely to be bent, as well as conventional loss films, into a predetermined twisted string, and produce recycled pellets that are comparable to virgin pellets by cutting the twisted string.

The position of the rotary shaft of the cutter was devised as described above to ensure the cutting of the pressure-bonded twisted string.

BRIEF DESCRIPTION OF DRAWINGS

FIG. 1 is a plan view of a basic embodiment of the present invention.

FIG. 2(a) of FIG. 2 is a plan sectional view of an intermediate feed section, and rotary compression and cutting sections in FIG. 1, and (b) of FIG. 2 is a cross-sectional view taken along a line X-X in (a) of FIG. 2.

FIG. 3(a) of FIG. 3 is a longitudinal sectional view of (a) of FIG. 2, and (b) of FIG. 3 is a side view of a casing in (a) of FIG. 3.

FIG. 4 shows a principal part of a rotary compression section in FIG. 1.

FIG. 5 is a longitudinal sectional view of a first heating section, and a narrowing part of the loss film supply section.

FIG. 6 is a plan sectional view of FIG. 5.

FIG. 7(a) of FIG. 7 is a view in which first and second heating sections are retracted to retracted positions, (b) of FIG. 7 is a view in which the first and second heating sections are returned to the heating position, and (c) of FIG. 7 is a view in which the first and second heating sections are in heating conditions.

FIG. 8 is an enlarged sectional view of the cutting section of the present invention.

FIG. 9 illustrates a cutting condition of a twisted string in FIG. 8.

FIG. 10(a) of FIG. 10 is a perspective view of a recycled pellet formed by the apparatus of the present invention, (b) of FIG. 10 is a side view of the recycled pellet, (c) of FIG. 10 is a front view of the recycled pellet, and (d) of FIG. 10 is another front view of the recycled pellet.

FIG. 11(a) of FIG. 11 is a plan view of a first embodiment of the present invention, and (b) of FIG. 11 is a modification thereof.

FIG. 12(a) of FIG. 12 is a plan view of a second embodiment of the present invention, and (b) of FIG. 12 is a modification thereof.

DESCRIPTION OF EMBODIMENTS

Hereinafter, the apparatus of the present invention is described according to the illustrated examples. The basic embodiment of the present invention includes, as shown in FIG. 1 to FIG. 9, a loss film supply section 1 having a narrowing part 2, a first heating section 60, an intermediate feed section 5, a rotary compression section 10, a cutting section 50, and a base 7 mounted with these sections and parts. In the first embodiment, as shown in FIG. 11, a pre-stretch feed section 3 is further disposed between the narrowing part 2 of the loss film supply section 1 and the first heating section 60. In the second embodiment, as shown in FIG. 12, a second heating section 80 is further disposed between the intermediate feed section 5 and the rotary compression section 10. The description starts with the basic embodiment. In the first and second embodiments, description will be made mainly for the parts that are different from those in the basic embodiment, and the same parts will be described in reference to the description of the basic embodiment.

In the above embodiments, a loss film R changes its shape in each step. In the basic embodiment, the loss film up to the narrowing part 2 of the loss film supply section 1 is referred to as "starting material loss film R", the loss film from the narrowing part 2 up to the intermediate feed section 5 is referred to as "loss film bundle R to be preheated" or "preheated loss film bundle R", the loss film from the intermediate feed section 5 up to a compression roller part 22 of the rotary compression section 10 is referred to as "stretched twisted string R", and the loss film from the compression roller part up to the cutting section 50 is referred to as "pressure-bonded twisted string R". Any loss films and strings are denoted by R.

Likewise, in the first embodiment, the loss film from the narrowing part 2 up to the intermediate feed section 5 is referred to as "pre-stretched loss film bundle R", and in the second embodiment, the loss film from the intermediate feed section 5 up to the compression roller part 22 is referred to as "stretched twisted string R to be secondarily heated" or "secondarily heated stretched twisted string R".

The motors used in the present invention may be motors with transmissions, but inverter motors, servo motors, or stepping motors are mainly used to facilitate speed control. In addition, as for the belts, timing belts are used to accurately transmit rotation.

As described in the above "Background Art", loss films R are bulk loss films (long selvages having a certain degree of width, and production loss) generated in a manufacturing process of resin films (thermoplastic resin) in the inflation molding or the T-die method. The width, the thickness, and the type of loss films are varied, and a loss film that is hard or thick and therefore is less likely to be bent, and a loss film having a large width can be recited. Any starting material loss film R has a width W1.

Basic Embodiment

The loss film supply section 1 lays one or more loss films R on one another, or narrows and folds the loss films R so as to have a width W2 capable of passing through the next first heating section 60, and supplies the loss films R to the first heating section 60. The loss films R may be narrowed by any method, but in this example, the narrowing part 2 is used. The loss films R may be supplied by rewinding a reel (not shown) or may be supplied in-line from the film forming machine.

The narrowing part 2 narrows and folds one or more wide loss films R, which are fed starting materials, to produce one narrowed loss film bundle R with a width W2.

In the present example, the narrowing part 2 is a die-like member, and has a narrowing hole 2a which is a funnel-like hole or slit having a wide entrance and a narrow exit. The opening width of the entrance is wider than a width W1 of the loss film R that is a fed starting material, and the exit is formed to have a width W2 that is narrower than a heating space Z for loss film R of the first heating section 60.

The narrowing part 2 passes one or more loss films R that are laid on one another through the narrowing hole 2a to narrow or fold the loss films R to form into the width W2.

The loss films R are supplied to the narrowing part 2 in accordance with the size or the bulk density of recycled pellets P, and the number of sheets supplied, the width W1, the thickness, the hardness, and the like are appropriately selected depending on the application of the recycled pellets P.

As the loss film supply section 1 having another structure, for example, the one having a structure described in PTL 1 (a dancer roll is arranged between an entrance fixed roll and an exit fixed roll in an elevating and lowering manner, and a certain tension is applied to one or more loss films that are continuously conveyed by being crossed between the both fixed rolls) (not shown) may also be used.

The first heating section 60 includes a heating section body 61, an opening/closing lid 62, a body driving part 66, a lid opening/closing mechanism 70, and a hot air supplying part 75 in the present example (FIG. 7).

The heating section body 61 is a long member with a square U-shaped cross section, and has an opening 61a extending over the entire length on one side face (one face on the moving side). The opening/closing lid 62 that opens and closes the opening 61a is disposed on the top surface of the heating section body 61 so as to be opened or closed via a hinge 62a, and the opening/closing lid 62, in a closed state, forms the heating space Z in a square cylindrical shape, with the heating section body 61.

The body driving part 66 includes: a slide mechanism 67 (slide block 67b equipped with ball bearings on a guide shaft 67a) disposed from the back side (retreated side) of the heating section body 61 downward to enable the heating section body 61 to move between a heating position and a retreated position; and a body driving cylinder 68 disposed on the back face of the heating section body 61.

The lid opening/closing mechanism 70 is designed to be opened or closed by a hinge mechanism as described above, and is opened and closed by a lid opening/closing cylinder 71.

The hot air supplying part 75 includes: a hot air supplying tube 76 attached to either or both of the top surface and the bottom surface (not shown) of the heating section body 61; and a heater 77 disposed inside the same. In the present example, the hot air supplying tube 76 is disposed only on the top surface of the heating section body 61.

The hot air supplying tube 76 is connected with a blower (not shown) to send air into the heating section body 61. The temperature control is performed by a temperature sensor (not shown) disposed in the heating section body 61, and the loss film R passing through the heating space Z is heated by the hot air heated to a softening temperature (for example, 100° C. to 500° C.). As a result, the loss film R comes to exhibit rubber elasticity. The heating temperature is entered in advance into a temperature controller (not shown) according to the type of the loss film R, and the optimum temperature is selected as appropriate.

The intermediate feed section 5 includes a pair of upper and lower intermediate rollers 5a and 5b, and an intermediate driving motor 6 connected to the intermediate roller 5b of the driving side. The surfaces of the intermediate rollers 5a and 5b are provided with recesses and projections (knurled or embossed) to prevent the narrowed loss film bundle R from slipping during the next stretching step. The area where the loss film R is sandwiched between the pair of upper and lower intermediate rollers 5a and 5b is a "starting point K of twisting".

The rotary compression section 10 includes a rotation part 11, a compression part 21 equipped inside the rotation part 11, and first and second driving parts 15 and 35 that independently rotate the rotation part 11 and the compression part 21. The rotary compression section 10 is disposed on the base 7.

The rotation part 11 includes a casing 12 and a first driven pulley 19, and the casing 12 is disposed in a rotatable manner on the base 7 via bearings 8 and 9.

The casing 12 of the rotation part 11 is divided into a front part 12a and a rear part 12b, the front part 12a is cylindrical, and the first driven pulley 19 and one bearing 8 are attached to the front part 12a.

The rear part 12b is hollow rectangular box-shaped. The front part 12a protrudes integrally from the front end of the rear part 12b. The other bearing 9 is attached to a support part of an exit part of the rear part 12b.

The compression part 21 includes: upper and lower compression rollers 22a and 22b that constitute the compression roller-part 22; upper and lower take-up rollers 25a and 25b; a hollow main gear member 40 to which a second driven pulley 39 is attached; and a gear train made up of a plurality of gears that mesh with the main gear member 40 and rotate the compression roller 22b on the driving side and the take-up roller 25b on the driving side. Of the above compression rollers 22a and 22b and take-up rollers 25a and 25b, any may be on the driving side.

The main gear member 40 comprises a main gear 40a and a hollow shaft portion 40b, the hollow shaft portion 40b is housed in a rotatable manner in the front part 12a of the casing 12, and the second driven pulley 39 is attached to the portion protruding outside the front part 12a.

The main gear 40a is disposed at an end part, inside the casing 12, of the hollow shaft portion 40b, and the main gear 40a is disposed to face a notched window of the casing 12.

On the outside of the casing 12, a driven gear 41 is disposed so that it partly enters the casing 12 through the notched window, and the driven gear 41 meshes with the main gear 40a through the notched window.

A main worm gear 42 is attached to the rotary shaft of the driven gear 41, and a driven worm gear 43 meshes with the main worm gear 42. The driven worm gear 43 is attached to one end of a rotary shaft 23 of the compression roller 22b on the driving side.

As shown in (a), (b) of FIG. 2 and (a), (b) of FIG. 3, a first transmission gear 44 is attached to the other end of the rotary shaft 23 of the compression roller 22b on the driving side, and rotation is transmitted to a third transmission gear 46 attached to the take-up roller 25b on the driving side via a second transmission gear 45 in the middle. Through the gear train from the first transmission gear 44 to the third transmission gear 46, the take-up roller 25b on the driving side is set to rotate slightly faster than the compression roller 22b on the driving side by about 10%.

The first driving part 15 includes a first driving motor 16 and a first driving pulley 17 attached to the rotary shaft thereof, and the first driving pulley 17 and the first driven pulley 19 are connected by a first timing belt 18.

Likewise, the second driving part 35 includes a second driving motor 36 and a second driving pulley 37 attached to the rotary shaft thereof, and the second driving pulley 37 and the second driven pulley 39 are connected by a second timing belt 38.

Each of the compression rollers 22a and 22b of the compression part 21 is a cylindrical member (or a cylindrical stack of disks with numerous jagged projections on its circumference). The outer surface thereof is a flat circular curved surface (not shown), or formed with numerous protrusions 24 that are hemispherical (warty) at the tip, or ellipsoidal in a plan view, or trapezoidal in a front view (see the enlarged view surrounded by the round frame in FIG. 2) over the entire surface. In the center of each of the compression roller 22a on the pressurizing side and the compression roller 22b on the driving side, the rotary shaft 23 is disposed, and both ends of the rotary shaft are supported by the casing 12 in a rotatable manner.

The upper compression roller 22a is disposed to be pressed by a spring (not shown) against the lower compression roller 22b on the driving side. As a result, the upper compression roller 22a is driven to rotate by rotation of the lower compression roller 22b on the driving side. The pressing force by the compression roller 22a on the pressurizing side is adjusted by a compression force adjustment mechanism (not shown). This may not necessarily be provided when there is no need to adjust the compression force.

The pair of upper and lower take-up rollers 25a and 25b of the compression part 21 are disposed on the downstream side of the compression roller part 22, and similar to the compression rollers 22a and 22b, respective rotation shafts 26 thereof are supported by the casing 12 in a rotatable manner. By the gear train from the first transmission gear 44 to the third transmission gear 46, the rotation force is transmitted from the compression roller 22b on the driving side.

Similar to the compression rollers 22a and 22b, the take-up rollers 25a and 25b are also provided with a pressing force adjustment mechanism (not shown) that adjusts the pressing force of the upper take-up roller 25a, which is to be a pressurizing side, against the lower take-up roller 25b, which is to be a pressurized side, by means of a spring (not shown). This may not necessarily be provided when there is no need to adjust the pressing force.

In the relationship between the compression roller 22b on the driving side and the intermediate roller 5b on the driving side, the compression roller 22b is set to rotate faster relative to the intermediate roller 5b. As a result, the preheated loss film bundle R that exhibits rubber elasticity and is transferred between the compression rollers 22a and 22b and the intermediate rollers 5a and 5b, is stretched while being twisted.

In the relationship between the rotation part 11 and the compression part 21, the main gear member 40 of the compression part 21 rotates independently of the rotation of the casing 12 of the rotation part 11. When the rotation of the main gear member 40 is faster than the rotation of the casing 12, the compression rollers 22a and 22b and the take-up rollers 25a and 25b also rotate forward to send out a pressure-bonded twisted string R in the direction toward the cutting section 50. When the above rotation speeds are the same, the compression rollers 22a and 22b and the take-up rollers 25a and 25b are stationary. Therefore, by adjusting the rotation speeds of the rotation part 11 and the compression part 21, it is possible to adjust the sending speed of the pressure-bonded twisted string R.

The cutting section 50 cuts the pressure-bonded twisted string R that has been compressed and formed with recessed indentations Y (embossing) as needed in the compression part 21, and drawn out by the take-up rollers 25a and 25b. As for the pressure-bonded twisted string R with recessed indentations Y, by cutting the string R at intervals containing at least one or more recessed indentations Y, preferably at intervals wider than the intervals of the recessed indentations Y formed on the surface of the string, the string is made into recycled pellets. As shown in FIG. 8, the cutting section 50 generally includes a housing 54, a cutter 51, a receiving blade 57, and a motor with a transmission (not shown).

The housing 54 is box-shaped. An inlet 55 for the pressure-bonded twisted string R is formed at the front face in the upper end part, and in the lower end part, a recycled pellet housing box (not shown) is removably inserted.

The cutter 51 is attached in a rotatable manner on the top of the housing 54, and a motor with a transmission (not shown) is connected to a rotary shaft O of the cutter 51. The rotation speed of cutter 51 is set appropriately according to the feed speed of the pressure-bonded twisted string R and the size of recycled pellets P.

The center of the rotary shaft O of the cutter 51 is set higher than the extension line of a movement line L of the pressure-bonded twisted string R by a height H, as can be seen from FIG. 8. The receiving blade 57 is disposed on the back (cutter side) of the inlet 55. A shearing surface 57s of the receiving blade 57 is slightly inwardly concaved and is formed in the direction of a tangent T that is in contact with a rotation track D of the tip end of the cutting blade 52 of the cutter 51 at a cutting position C. Therefore, the angle formed between the top surface of the receiving blade 57 (sliding surface of the pressure-bonded twisted string R) and the shearing surface 57s is an obtuse angle. As shown in FIG. 4, the cutting blade 52 is inclined with respect to the receiving blade 57 to shear the pressure-bonded twisted string R.

Next, the case of producing recycled pellets P using the recycled pellet producing apparatus A1 is described. At the time of setting the loss film R, the heating section body 61 of the first heating section 60 is located at a retracted position off the movement line L of the narrow loss film bundle R to be preheated, in a lid open state ((a) of FIG. 7).

First, one or more wide loss films R as a starting material are set in the loss film supply section 1 as specified. In the case where a plurality of wide loss films R are set, these are drawn together and laid on one another, and the tip end part thereof is gently twisted to be collected together.

Subsequently, the loss film R is passed through the narrowing hole 2a of the narrowing part 2. The starting material loss film R of the width W1 is narrowed by passing through the narrowing hole 2a to become a loss film bundle R of the width W2.

The narrow loss film bundle R drawn out as described above passes in front of the heating section body 61 of the first heating section 60, which is at the retracted position shown by the two dotted lines in FIG. 1, and is drawn into the intermediate feed section 5. Since the intermediate rollers 5a and 5b of the intermediate feed section 5 are formed with recesses and projections on their outer circumferences, it becomes possible to draw out the loss film bundle R from the narrowing part 2 by the engagement and the rotation.

Then, the loss film R passed between the intermediate rollers 5a and 5b of the intermediate feed section 5 is inserted, at its insertion end, between the pair of compression rollers 22a and 22b, between the take-up rollers 25a and 25b, and into the inlet 55 in this order, whereby the leading end of the loss film R is brought to face the cutter 51.

Since this point of time is in a stage before processing, when the loss film R that has not been stretched and twisted is passed between the pair of compression rollers 22a and 22b, the pressing force of the compression roller 22a on the pressurizing side against the compression roller 22b on the driving side is released in advance to free the compression roller 22a on the pressurizing side.

Thereafter, the body driving cylinder 68 of the first heating section 60 is actuated to move the heating section body 61 forward from the retracted position to a heating position where the loss film R is to be surrounded, and then the lid opening/closing cylinder 71 is actuated to close the opening/closing lid 62, thereby bringing the interior of the heating space Z into a condition that allows passage of the loss film R.

Once the setting of the loss film R is completed as described above, the power is turned on to actuate the recycled pellet producing apparatus A1 and production of recycled pellets P is started.

In the intermediate feed section 5, the rollers 5a and 5b operate to pass the loss film R through the narrowing part 2 of the loss film supply section 1 while applying a certain tension on the loss film R.

As described above, since the exit is narrower than the entrance in the narrowing hole 2a, the wide loss film R is narrowed or folded in this narrowing hole 2a and drawn out from the exit as a narrow loss film bundle R.

In the first heating section 60, the heater 77 is energized, and the wind passing through the hot air supplying tube 76 is heated to a predetermined temperature (softening temperature) and blown into the heating section body 61 to heat the loss film R passing through the heating space Z at that temperature. The loss film R exhibits rubber elasticity. This hot air flows through the heating space Z in a rotating manner, heats not only the surface of the loss film R but also the interior of the loss film to some extent, and uniformly heats at least the surface part of the film. Then, the hot air is jetted along the surface of the loss film R from the front and rear openings of the heating section body 61 while heating the surface.

In the first embodiment, since a tension is applied to the passing loss film bundle R only when it is drawn out from the narrowing part 2, the passing loss film bundle R is hardly stretched although it is heated. In other words, the loss film bundle R is heated at the softening temperature at which rubber elasticity is exhibited as described above, but the tension in the narrowing part 2 is not high, and therefore, the loss film bundle R is not stretched significantly by stretching even under heating.

The preheated loss film bundle R, which is sent from the intermediate rollers 5a and 5b to the compression rollers 22a and 22b, is stretched between the intermediate rollers 5a and 5b and the compression rollers 22a and 22b while being twisted to become a stretched twisted string R, and subsequently, the stretched twisted string R is compressed by the compression rollers 22a and 22b to become a pressure-bonded twisted string R. Then, the surfaces of the preheated loss film bundle R that are in contact with each other adhere to each other due to pressurization by the intermediate rollers 5a and 5b (the pressurization in this part is strong pressurization).

Further, the preheated loss film bundle R is sent out from the intermediate rollers 5a and 5b, and stretched narrowly and thinly by stretching in this part, and simultaneously twisted by twisting to become one cylindrical stretched twisted string R with the contact surfaces of the twisted part adhering to each other. The compression by the compression rollers 22a and 22b need not be such strong compression that flattens the cross section as before, but is such weak compression that can apply a twist to the preheated and stretched loss film bundle R. Next, the function of the rotary compression section 10 is described.

When the first and second driving motors 16 and 36 are actuated, the first and second driven pulleys 19 and 39 rotate around the movement line L of the preheated loss film bundle R sent out from the intermediate rollers 5a and 5b, via the first and second timing belts 18 and 38. Since the first driven pulley 19 is attached to the front part 12a of the casing 12, the compression rollers 22a and 22b and the take-up rollers 25a and 25b mounted inside also rotate together. The loss film in this part is fed while being sandwiched and twisted between the compression rollers 22a and 22b. Accordingly, a twist is applied by the compression rollers 22a and 22b, which rotate together with the casing 12 from a holding point of the intermediate rollers 5a and 5b as a starting point K, whereby the loss film becomes a stretched twisted string R.

This step is a step of applying a twist and a stretch to the preheated loss film bundle R (stretching and twisting step), and the compression force may be such a degree of force that can apply a twist while preventing the stretched twisted strand R, which is easily stretched and twisted due to heating, from slipping with respect to the compression rollers 22a and 22b due to the tension at the time of stretching. In other words, the compression force in this step is not like the conventional compression force that applies a twist under a non-heated condition and crushes the loss film bundle until it is flattened to form deep recessed indentations.

As the second driven pulley 39 rotates around the stretched twisted string R, the main gear member 40 rotates. The main gear 40a of the main gear member 40 rotates the side driven gear 41, and rotates the compression roller 22b on the driving side in the feed direction of the stretched twisted string R via the main and driven worm gears 42 and 43. Since the compression roller 22a on the pressurizing side is pressed against the compression roller 22b on the driving side with a predetermined pressure, the compression roller 22a on the pressurizing side and the compression roller 22b on the driving side rotate in the feed direction of the stretched twisted string R. Since the stretched twisted string R that is being twisted is sandwiched between these compression rollers 22a and 22b with a predetermined pressurizing force, recessed indentations Y are continuously formed on both upper and lower surfaces when the protrusions 24 are formed in this part. Since the stretched twisted string R is preheated to the softening temperature as described above, the films are further tightly pressure-bonded to each other at the bottoms of the recessed indentations Y. (The indentations Y can be omitted if the bonding of the films at the surface part by the pressure-bonding is sufficient.)

As described above, the first transmission gear 44 is attached to the other end of the compression roller 22b on the driving side, and the third transmission gear 46 attached to the take-up roller 25b on the driving side rotates via the second transmission gear 45. Since the take-up roller 25a on the pressurizing side is pressed against the take-up roller 25b on the driving side with a constant pressing force while the stretched twisted string R is sandwiched, the take-up roller 25a on the pressurizing side also rotates in the feed direction. The pressure-bonded stretched twisted string R is referred to as a pressure-bonded twisted string R.

When the protrusions 24 are formed on the compression rollers 22a and 22b, the protrusions 24 enter the pressure-bonded twisted string R and the pressure-bonded twisted string R is difficult to be drawn out. However, since the take-up rollers 25a and 25b are rotating in the feed direction slightly faster than the compression rollers 22a and 22b, a tension is applied to the pressure-bonded twisted string R that is sandwiched between the compression rollers 22a and 22b and is difficult to be drawn out due to entrance of the protrusions 24 into the recessed indentations, so that the pressure-bonded twisted string R is smoothly drawn out from between the compression rollers 22a and 22b. The drawn out pressure-bonded twisted string R is sent out toward the cutting section 50 by the take-up rollers 25a and 25b. As described above, the feed speed of the take-up rollers 25a and 25b is faster than that of the compression rollers 22a and 22b, and the pressure-bonded twisted string R is drawn from the compression rollers 22a and 22b in a taut state.

The pressure-bonded twisted string R, which is sent out from the take-up rollers 25a and 25b in a taut state, is kept in that state, passes through the inlet 55 without any vertical and lateral disorders in running, and goes over the cutting position C to be fed into the cutting section 50. By the rotation of the cutter 51, the pressure-bonded twisted string R is cut at the cutting position C, and recycled pellets P are produced.

FIG. 10 is a view of a recycled pellet P. In (b) of FIG. 10, the cross section is almost circular because compression of the compression rollers 22a and 22b is weak. In (c) of FIG. 10, the cross section is deformed to be flat because compression of the compression rollers 22a and 22b is relatively strong. The almost circular cross section is preferred because it is similar to the cross section of a virgin pellet. Recessed indentations Y are provided in any case. In the case of heating, recessed indentations Y may be provided as described above, however, recessed indentations Y need not necessarily be provided as described above, and may be dispensed with.

In cutting of the pressure-bonded twisted string R, the cutting angle at which a shearing force F of the cutting blade 52 is generated falls toward the rotary compression section 10 by an angle θ relative to a perpendicular line S erected at the cutting position C (FIG. 8). This straight line is a tangent line T to the track D of the tip end of the cutting blade 52 at the cutting position C. The shearing force F can be resolved into a force F1 in the direction of the perpendicular line S (force for cutting the pressure-bonded twisted string R) and a force F2 in the feed direction of the pressure-bonded twisted string R, which is orthogonal to the perpendicular line S.

The force F2 is a drawing-in force for the pressure-bonded twisted string R at the time of cutting. Since the cutting blade 52 reaches the cutting position C one after another in a short time, the drawing-in force F2 is continuously applied to the pressure-bonded twisted string R at the time of cutting. As a result, the insertion end of the pressure-bonded twisted string R at the time of cutting does not disorderly run in the inlet 55, coupled with the above sending condition, so that smooth cutting without using a conventional guide roller is enabled. Therefore, untwisting at the time of cutting, which has been a problem in the past, can be eliminated.

When the loss film R breaks at any location during the above operation, the movement of the loss film R is stopped, the lid opening/closing cylinder 71 is actuated to open the opening/closing lid 62, and then the body driving cylinder 68 is actuated to retract the heating section body 61 from the movement line L of the loss film R. This is to retract the heating section 61, and there is no need to stop the airflow of the first heating section 60 and the energization of the heater 77 (the heat-up time after return is reduced).

After that, a cut portion of the loss film R is removed, the loss film R is re-set and the first heating section 60 is restored as previously described, and the process is restarted.

First embodiment: FIG. 11

In an apparatus A2 according to the first embodiment, the pre-stretch feed section 3 is further disposed between the loss film supply section 1 and the first heating section 60.

Here, the pre-stretch feed section 3 and the intermediate feed section 5 are prepared for transporting the loss film R. Therefore, there are two cases: the case of disposing the driving motors 4 and 6 in both of the pre-stretch feed section 3 and the intermediate feed section 5; and the case of disposing them only in the pre-stretch feed section 3.

The case of disposing the driving motors 4 and 6 in both of the pre-stretch feed section 3 and the intermediate feed section 5 is described by referring to (a) of FIG. 11.

In this case, the configuration of the pre-stretch feed section 3 is the same as that of the intermediate feed section 5 of the basic embodiment, and it includes a pair of upper and lower pre-stretch rollers 3*a* and 3*b* and a pre-stretch driving motor 4 connected to the pre-stretch roller 3*b* on the driving side.

The sending speed of the pre-stretch feed section 3 is slower than the take-up speed of the intermediate feed section 5, and the loss film bundle R between the pre-stretch feed section 3 and the intermediate feed section 5 is tensioned and pre-stretched in a temperature atmosphere for softening, in the first heating section 60. As a result, it is possible to make materials that have been inapplicable to the conventional apparatus thin or wide enough to be twisted. Also, those made of hard materials can be softened.

The surfaces of the pre-stretch rollers 3*a* and 3*b* are also provided with recesses and projections (knurled or embossed) to prevent slipping in the pre-stretching. The remainder is the same as that in the basic embodiment.

In contrast, in the case of (b) of FIG. 11, the intermediate feed section 6 is provided with only the intermediate rollers 5*a* and 5*b* and is not provided with the intermediate drive motor 5. Hence, the intermediate rollers 5*a* and 5*b* rotate in a driven manner while sandwiching the loss film R by drawing-in of the rotary compression section 10, and serve as the starting point K of twisting. Therefore, the sending speed of the pre-stretch feed section 3 is slower than the drawing-in speed of the rotary compression section 10.

Then, the loss film bundle R between the pre-stretch feed section 3 and the intermediate feed section 5 is tensioned and pre-stretched in a temperature atmosphere for softening, in the first heating section 60.

Second embodiment: FIG. 12

In the second embodiment, the second heating section 80 is further disposed between the intermediate feed section 5 and the rotary compression section 10, as previously described.

The second heating section 80 is the same as the first heating section 60 in structure and operation, despite the difference in dimension, and is composed of a heating section body 81, an opening/closing lid 82, a body driving part 86, a lid opening/closing mechanism 90, and a hot air supplying part 95, and includes a hinge 82*a* and a slide mechanism 87 (a guide shaft 87*a*, a slide block 87*b*, body driving cylinders 88 and 91) (FIG. 7). The first heating section 60 and the second heating section 80 are shared to simplify the drawing (FIGS. 5, 6, and 7).

That is, in the second heating section 80, the heater 97 is energized with the actuation, and the wind passing through the hot air supplying tube 96 is heated to a predetermined temperature (softening temperature) and blown into the heating section body 81 to heat the stretched twisted string R, to be secondarily heated, that is passing through the heating space Z at that temperature. This hot air flows in a rotating manner through the heating space Z, heats the stretched twisted string R being secondarily heated, from the surface to a certain extent of the interior, and uniformly heats at least the surface part of the film. Then, the hot air is jetted from the front and rear openings of the heating section body 81.

Since the second heating section 80 secondarily heats the twisted string R, before pressurization, sent out from the intermediate feed section 5 at the softening temperature, the viscosity is further increased and the compactness due to adhesion between the contacting loss films R and twisting increases, making it possible to produce recycled pellets having density similar to that of virgin pellets.

Also, in this case, there are two cases: the case of disposing the driving motors 4 and 6 in both of the pre-stretch feed section 3 and the intermediate feed section 5; and the case of disposing them only in the pre-stretch feed section 3, a stretch as described in the first embodiment is obtained, and a stretch and a twist are further applied during the secondary heating by the second heating section 80.

REFERENCE SIGNS LIST

A1, A2, A3 recycled pellet producing apparatus of present invention
C cutting position
D track of cutting blade
F shearing force
F1 force in direction of perpendicular line
F2 force in drawing-in direction
H height of cutter
Ko starting point of pre-stretching
K starting point of twisting
L movement line
O rotary shaft of cutter
P recycled (resin) pellets
R starting material loss film, loss film bundle to be preheated or preheated loss film bundle, stretched twisted string, pressure-bonded twisted string, heated pre-stretched loss film bundle, stretched twisted string to be secondarily heated, or secondarily heated stretched twisted string
S perpendicular line
T tangent line
W1 width of starting material loss film
W2 width of loss film bundle
Y recessed indentation
Z heating space
θ cutting angle
1 loss film supply section
2 narrowing part
2*a* narrowing hole
3 pre-stretch feed section
3*a*, 3*b* pre-stretch roller
4 pre-stretch driving motor
5 intermediate feed section
5*a*, 5*b* intermediate roller
6 intermediate driving motor
7 base
8, 9 bearing
10 rotary compression section
11 rotation part
12 casing
12*a* front part
12*b* rear part
15 first driving part
16 first driving motor
17 first driving pulley
18 first timing belt
19 first driven pulley
21 compression part
22 compression roller part
22*a* compression roller on pressurizing side 22b compression roller on driving side
23 rotary shaft
24 protrusion
25a take-up roller on pressurizing side
25b take-up roller on driving side
26 rotary shaft
35 second driving part
36 second driving motor
37 second driving pulley
38 second timing belt
39 second driven pulley
40 main gear member
40a main gear
40b hollow shaft portion
41 driven gear
42 main worm gear
43 driven worm gear
44 first transmission gear
45 second transmission gear
46 third transmission gear
50 cutting section
51 cutter
52 cutting blade
54 housing
55 inlet
57 receiving blade
57s shearing surface
60 first heating section
61 heating section body
61a opening
62 opening/closing lid
62a hinge
66 body driving part
67 slide mechanism
67a guide shaft
67b slide block
68 body driving cylinder
70 lid opening/closing mechanism
71 lid opening/closing cylinder
75 hot air supplying part
76 hot air supplying tube
77 heater
80 second heating section
81 heating section body
81a opening
82 opening/closing lid
82a hinge
86 body driving part
87 slide mechanism
87a guide shaft
87b slide block
88 body driving cylinder
90 lid opening/closing mechanism
91 lid opening/closing cylinder
95 hot air supplying part
96 hot air supplying tube
97 heater

The invention claimed is:

1. An apparatus for producing recycled pellets, comprising:
a loss film supply section configured to bundle one or more loss films of thermoplastic resin into a predetermined width, and supply a resultant loss film bundle to an intermediate feed section;
the intermediate feed section configured to send out the supplied loss film while sandwiching the supplied loss film, the intermediate feed section serving as a starting point of twisting of the loss film; and
a rotary compression section supplied with the loss film from the intermediate feed section, and configured to rotate relatively to the intermediate feed section to twist the loss film, take up the loss film faster than a sending speed of the intermediate feed section to apply a stretch to the loss film, and send out a twisted string,
the apparatus producing recycled pellets by cutting the twisted string sent out from the rotary compression section, at a predetermined length, wherein
a first heating section configured to preheat the loss film at a softening temperature of the loss film is disposed between the loss film supply section and the intermediate feed section, and
the first heating section comprises:
a heating section body that reciprocates between a heating position that surrounds a movement line of a loss film bundle to be preheated, and a retracted position out of the heating position, the heating section body having an opening that is a gate for the loss film to be preheated during the reciprocation, the opening being formed over the entire surface of the heating section body on a moving direction side;
an opening/closing lid that closes the opening at the time of heating to form a heating space inside for the loss film; and
a hot air supplying part that supplies the heating space with hot air.

2. An apparatus for producing recycled pellets, comprising:
a loss film supply section configured to bundle one or more loss films of thermoplastic resin into a predetermined width, and supply a resultant loss film bundle to an intermediate feed section;
the intermediate feed section configured to send out the supplied loss film while sandwiching the supplied loss film, the intermediate feed section serving as a starting point of twisting of the loss film; and
a rotary compression section supplied with the loss film from the intermediate feed section, and configured to rotate relatively to the intermediate feed section to twist the loss film, take up the loss film faster than a sending speed of the intermediate feed section to apply a stretch to the loss film, and send out a twisted string,
the apparatus producing recycled pellets by cutting the twisted string sent out from the rotary compression section, at a predetermined length, wherein
a first heating section configured to preheat the loss film at a softening temperature of the loss film is disposed between the loss film supply section and the intermediate feed section,
a second heating section that heats a stretched twisted string before pressurization having been twisted and stretched by the intermediate feed section and the rotary compression section, at a softening temperature of the stretched twisted string before pressurization, is further disposed between the intermediate feed section and the rotary compression section, and
the second heating section comprises:
a heating section body that reciprocates between a heating position that surrounds a movement line of a stretched twisted string to be secondarily heated, and a retracted position out of the heating position, the heating section body having an opening that is a gate for the stretched twisted string to be secondarily heated during the reciprocation, the opening being formed over the entire surface of the heating section body on a moving direction side;
an opening/closing lid that closes the opening at the time of heating to form a heating space inside for the stretched twisted string to be secondarily heated; and
a hot air supplying part that supplies the heating space with hot air.

\* \* \* \* \*